(12) United States Patent
Cacciabeve (10) Patent No.: US 11,892,121 B1
(45) Date of Patent: Feb. 6, 2024

(54) FLEXIBLE MAGNETIC SPRAY CAN HOLDER

(71) Applicant: Walter R. Tucker Enterprises, Ltd., Deposit, NY (US)

(72) Inventor: Robert Cacciabeve, Denville, NJ (US)

(73) Assignee: Walter R. Tucker Enterprises, Ltd, Deposit, NY (US)

( * ) Notice: Subject to any disclaimer, the term of this patent is extended or adjusted under 35 U.S.C. 154(b) by 0 days.

(21) Appl. No.: 18/239,585

(22) Filed: Aug. 29, 2023

Related U.S. Application Data (60) Provisional application No. 63/402,170, filed on Aug. 30, 2022.

(51) Int. Cl.
*F16M 13/02* (2006.01)
*B65D 83/14* (2006.01)

(52) U.S. Cl.
CPC ............. *F16M 13/02* (2013.01); *B65D 83/75* (2013.01)

(58) Field of Classification Search
CPC ............ F16M 13/02; B65D 83/75; H01F 7/00

USPC ............................................ 248/206.5, 309.4
See application file for complete search history.

(56) References Cited

U.S. PATENT DOCUMENTS

| | | | | |
|---|---|---|---|---|
| 5,456,359 | A * | 10/1995 | Horn | B25H 3/06 |
| | | | | 211/DIG. 1 |
| 6,811,127 | B1 * | 11/2004 | Shiao | B25H 3/04 |
| | | | | 211/DIG. 1 |
| 8,967,562 | B1 * | 3/2015 | Bileth | F16M 13/022 |
| | | | | 248/311.2 |
| 9,126,329 | B2 * | 9/2015 | Kao | F16M 13/022 |
| 9,205,552 | B2 * | 12/2015 | Kao | F16M 13/022 |
| 10,472,161 | B2 * | 11/2019 | Sater | B65D 83/303 |
| 11,319,717 | B1 * | 5/2022 | Kukuruda | E04G 21/1841 |
| 11,504,843 | B2 * | 11/2022 | Cacciabeve | B25H 3/003 |
| 2022/0048691 | A1 * | 2/2022 | Adjeleian | B65D 81/3879 |

* cited by examiner

*Primary Examiner* — Todd M Epps
(74) *Attorney, Agent, or Firm* — Breiner & Breiner, L.L.C.

(57) ABSTRACT

A flexible magnetic spray can holder having a front wall having one or more magnets to engage and hold a spray can and having a back wall having one or more magnets to attach the spray can holder to a metal surface.

15 Claims, 13 Drawing Sheets

FLEXIBLE MAGNETIC SPRAY CAN HOLDER

RELATED APPLICATION

This application claims benefit of U.S. Provisional Application Ser. No. 63/402,170, filed Aug. 30, 2022, entitled "Flexible Magnetic Spray Can Holder," which application is incorporated herein in its entirety.

FIELD OF THE INVENTION

The present invention relates to a flexible magnetic spray can holder. More particularly, the invention relates to a flexible magnetic spray can holder wherein the holder holds a spray can to the holder by one or more magnets and the holder may be held to a metal surface by one or more magnets.

BACKGROUND OF THE INVENTION

There are no known flexible magnetic spray can holders.

Various types of spray can holders are known. Such spray can holders are not flexible and/or are not magnetic.

Applicant has developed other flexible magnetic products directed to tools, including as set forth in U.S. Pat. No. 11,504,843, entitled "Flexible Magnetic Socket Holder," and U.S. application Ser. No. 17/897,859, entitled "Flexible Magnetic Mat," and U.S. application Ser. No. 17/950,669, entitled "Flexible Magnetic Wrench Holder," which patent and applications are incorporated herein by reference in their entirety.

The known spray can holders have various shortcomings and improvement is necessary. These and other shortcomings of these devices are addressed by the present invention.

SUMMARY OF THE INVENTION

A primary object of the present invention is to provide a flexible magnetic spray can holder.

Another primary object of the invention is to provide a flexible magnetic spray can holder to keep a spray can collection organized by use of one or more of the holders.

Another primary object of the invention is to provide a flexible magnetic spray can holder to hold a spray can to the holder by one or more magnets.

Another primary object of the invention is to provide a flexible magnetic spray can holder to attach the holder by one or more magnets to a metal surface.

Another primary object of the invention is to provide a flexible magnetic spray can holder wherein the holder is preferably made of a flexible thermoplastic elastomer (TPE) such that the holder will not mar or scratch the surface to which it is attached.

Another primary object of the invention is to provide a flexible magnetic spray can holder which uses strong neodymium magnets to grip the spray can tight to the holder and to attach the holder to a metal surface.

Another primary object of the invention is to provide a flexible magnetic spray can holder using magnets which are wrapped in steel to increase the grip of a lower grade magnet.

Another primary object of the invention is to provide a flexible magnetic spray can holder wherein the holder includes a clip to hold a spray can cap.

Another primary object of the invention is to provide a flexible magnetic spray can holder wherein the holder includes a mounting hole such that the holder can be mounted on a peg board.

Another primary object of the invention is to provide a flexible magnetic spray can holder wherein the holder includes a ledge at the bottom of the holder to prevent the spray can from sliding downward.

The invention is directed to a flexible magnetic spray can holder comprising a front wall, a back wall, side walls, a top and a bottom. The front wall has one or more magnets for engaging and holding a spray can. The back wall has one or more magnets for attaching the holder to a metal surface. The holder may include a clip to hold a cap of a spray can. The holder may include a means for engaging the bottom of the spray can to prevent the spray can from sliding downward.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

DETAILED DESCRIPTION OF THE PREFERRED EMBODIMENTS

Referring to the drawings, there is shown a new and unique flexible magnetic spray can holder. The spray can holder is preferably made of a thermoplastic elastomer which will provide some flexibility to the spray can holder. The spray can holder body is preferably one piece and made by injection molding. The spray can holder will hold a spray can to the holder by magnets. The spray can holder may be attached to a metal surface by magnets on the back of the holder. FIGS. 1-12 show a first embodiment of the spray can holder. A second embodiment is shown in FIGS. 13-20 and a third embodiment is shown in FIGS. 21-27. The spray can holder will now be described in further detail.

Referring to FIGS. 1-12, there is shown a first embodiment of the spray can holder. Specifically, there is shown a spray can holder 10 having a front wall 12, a back wall 14, side walls 16,18, a top 20 and a bottom 22, preferably one piece. Magnets 24 and 26 are in front wall 12 for holding a spray can to the holder. Magnets 28 and 30 are in back wall 14 for attaching the holder to a metal surface. There is a ledge 32 at bottom 22 for engaging the bottom of a spray can and to keep the spray can from moving downward. At top 20, there is a clip 34 for holding a spray can cap. Clip 34 comprises prongs 36, 38 and 40 providing openings 36A and 40A for receiving the spray can cap. Prong 38 includes a finger 42 for holding the cap in place by pressure.

Figure 1A:
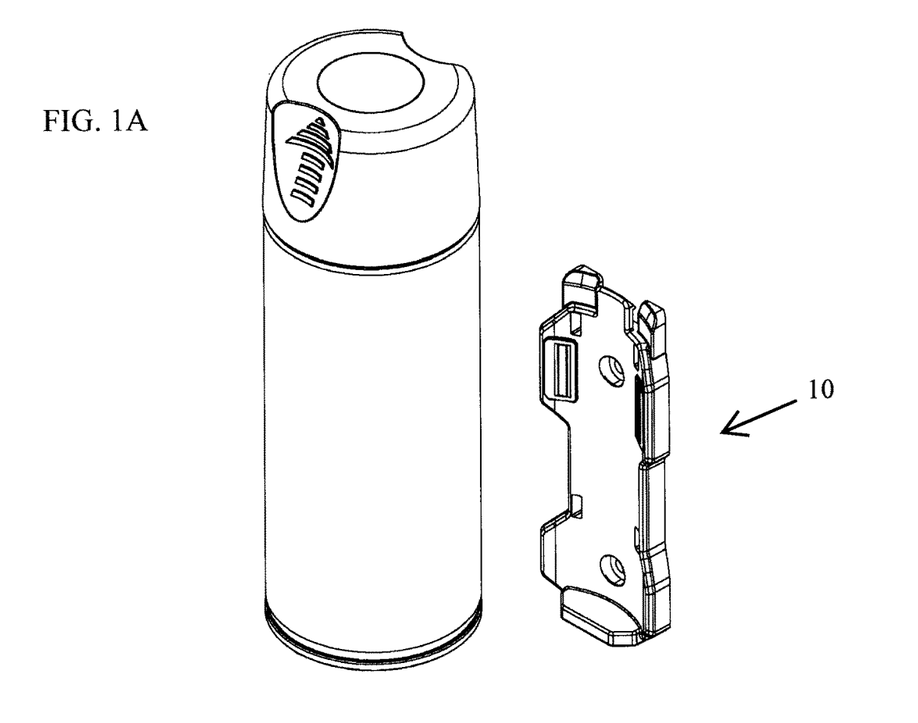
FIG. 1A is a front perspective view of a first embodiment of the spray can holder of the invention and a spray can.
Figure 1B:
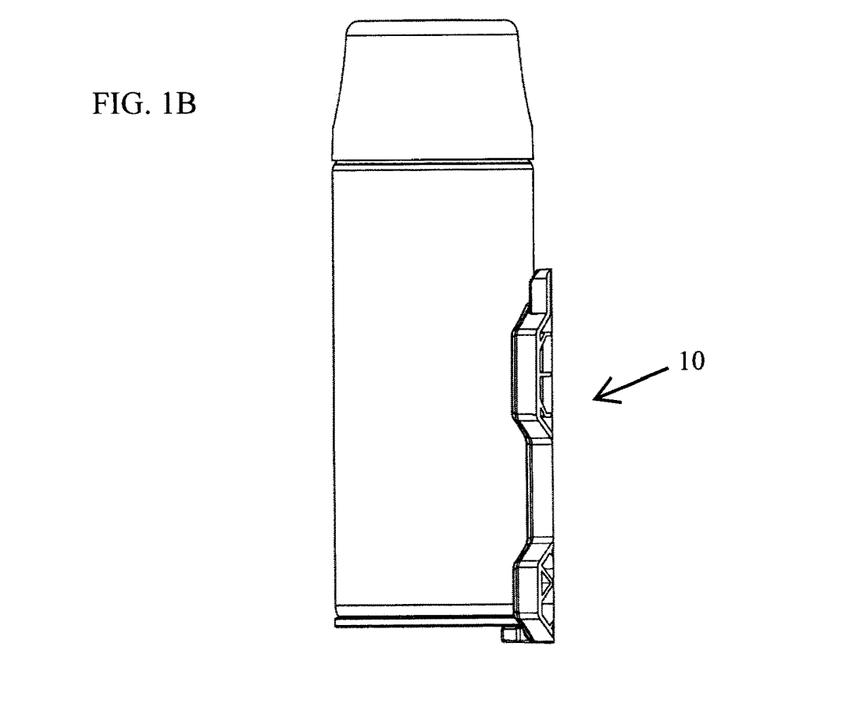
FIG. 1B is a side view of the spray can holder of FIG. 1A with the spray can held in the holder.
Figure 2A:
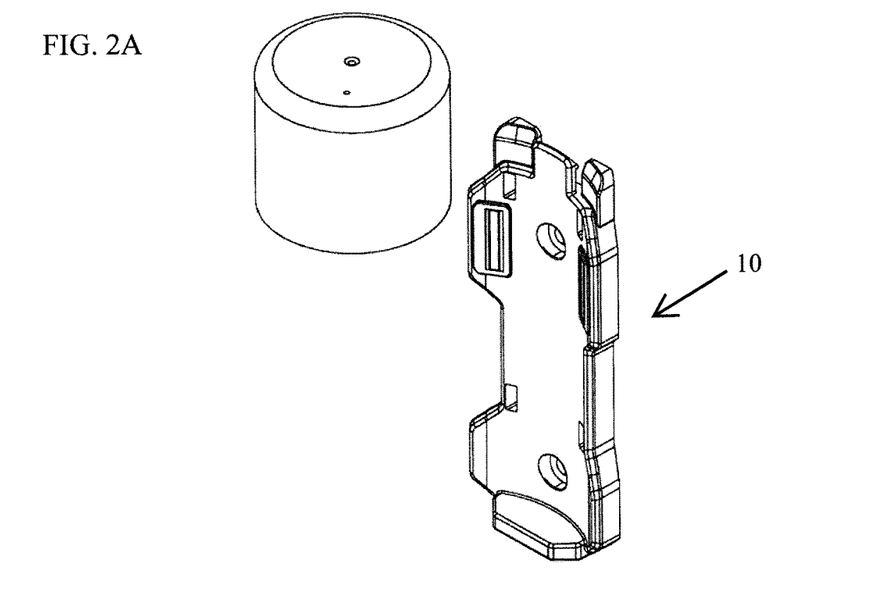
FIG. 2A is a perspective view of the spray can holder of FIG. 1A and a spray can cap.
Figure 2B:
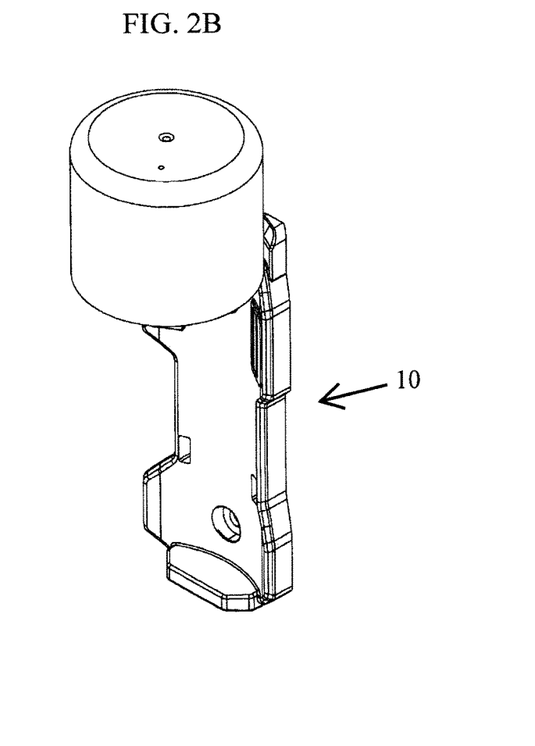
FIG. 2B is a perspective view of the spray can holder of FIG. 1A holding the spray can cap.
Figure 2C:
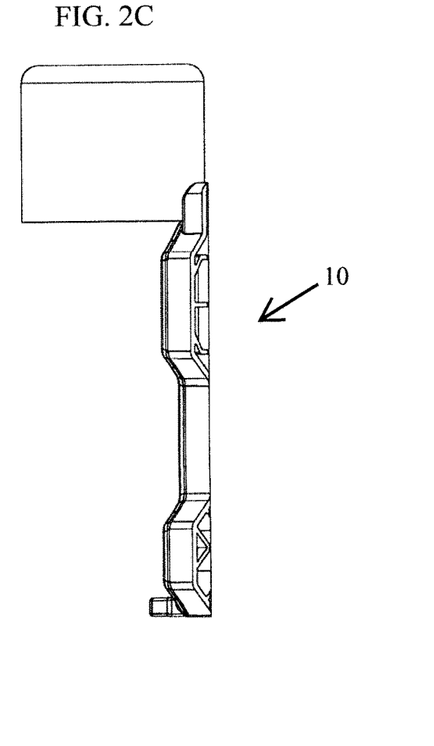
FIG. 2C is a side view of the spray can holder of FIG. 1A holding the spray can cap.
Figure 3:
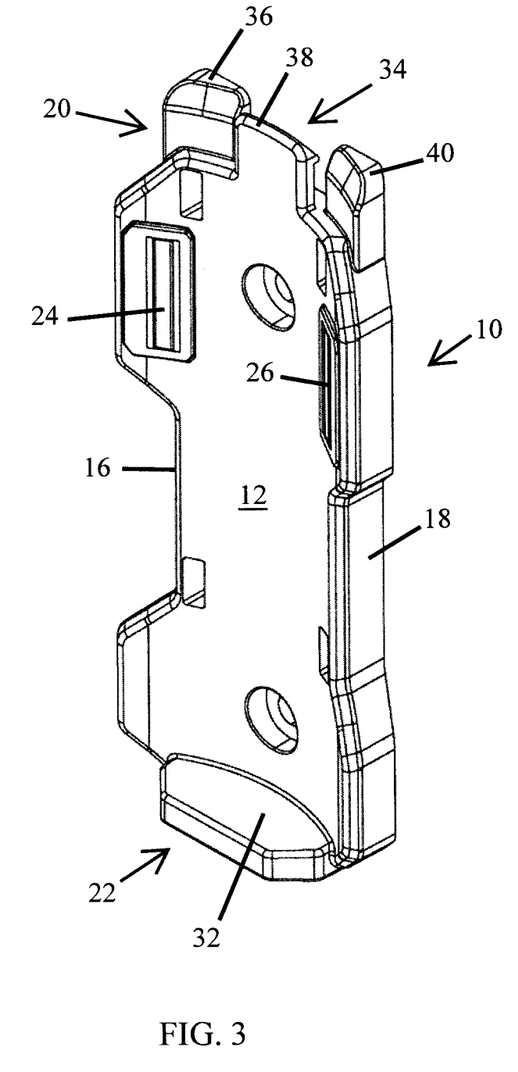
FIG. 3 is a front perspective view of the spray can holder of FIG. 1A.
Figure 4:
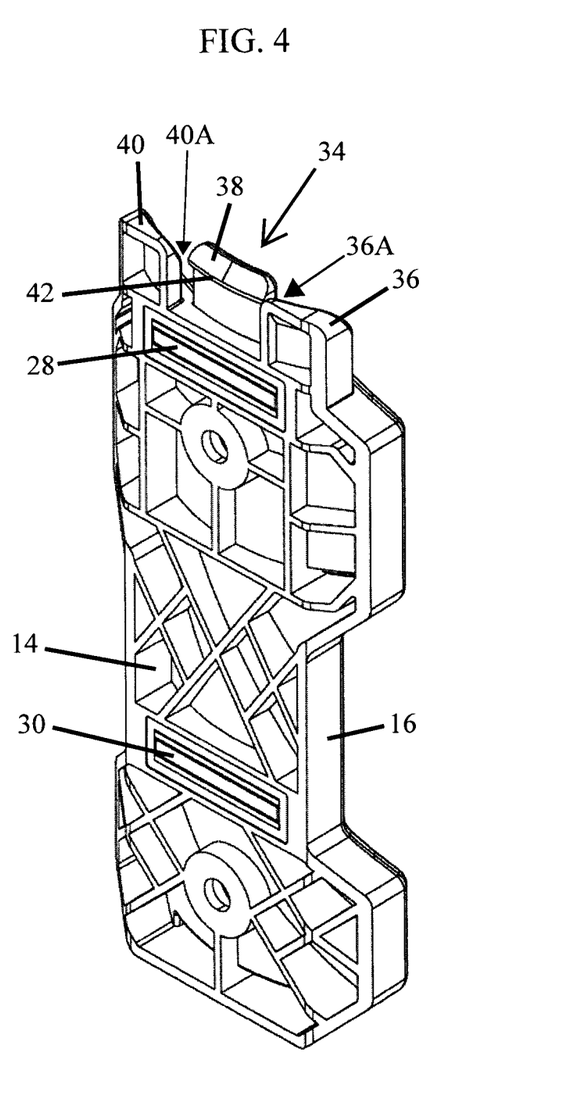
FIG. 4 is a back perspective view of the spray can holder of FIG. 1A.
Figure 5:
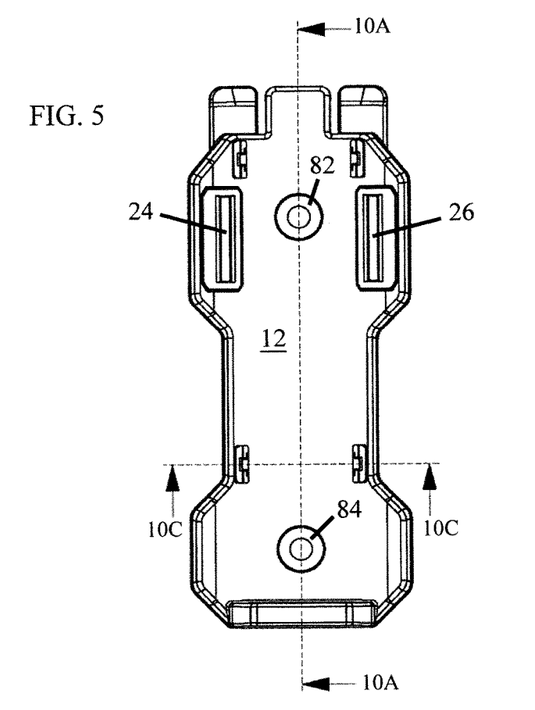
FIG. 5 is a front view of the spray can holder of FIG. 1A.
Figure 6:
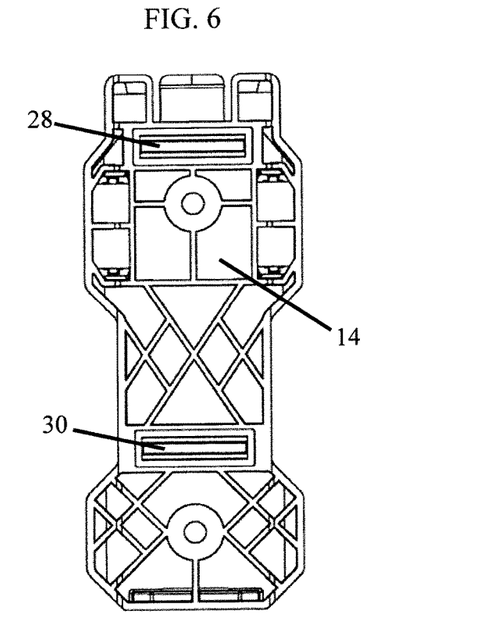
FIG. 6 is a back view of the spray can holder of FIG. 1A.
Figure 7:
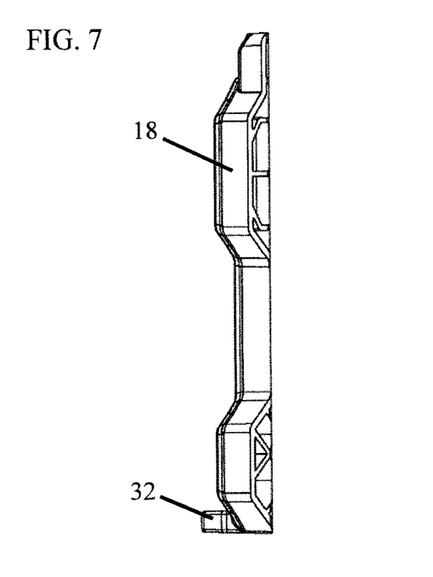
FIG. 7 is a side view of the spray can holder of FIG. 1A.
Figure 8:
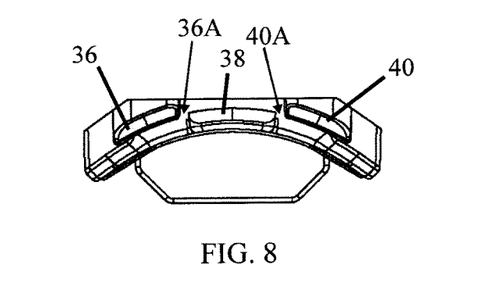
FIG. 8 is a top view of the spray can holder of FIG. 1A.
Figure 9:
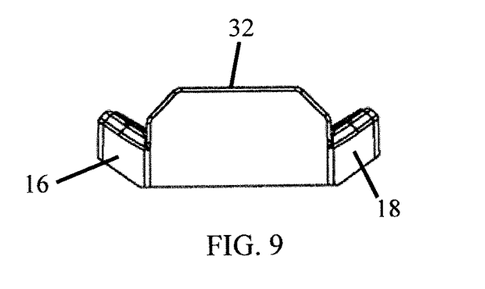
FIG. 9 is a bottom view of the spray can holder of FIG. 1A.
Figure 10A:
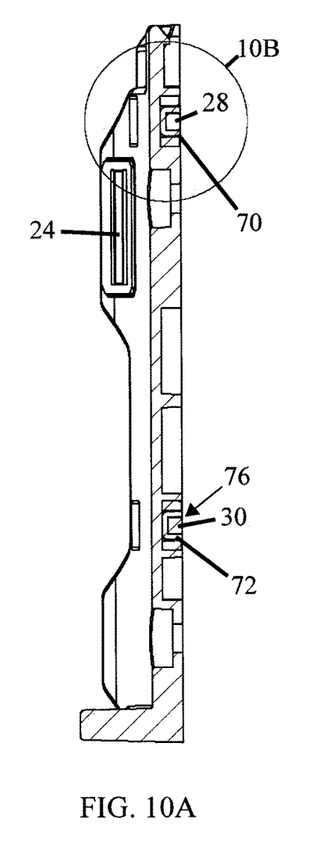
FIG. 10A is a cross-section of the spray can holder of FIG. 5 taken along lines 10A-10A.
Figure 10B:
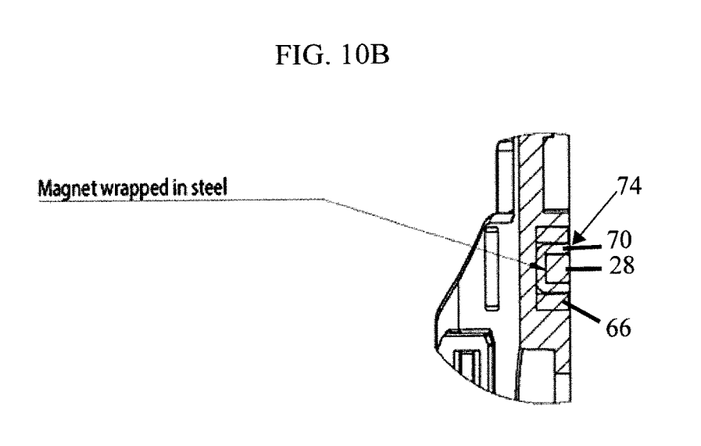
FIG. 10B is an enlarged view of section 10B of FIG. 10A.
Figure 10C:
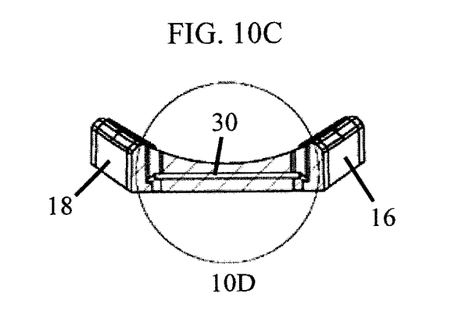
FIG. 10C is a cross-section of the spray can holder of FIG. 5 taken along lines 10C-10C.
Figure 10D:
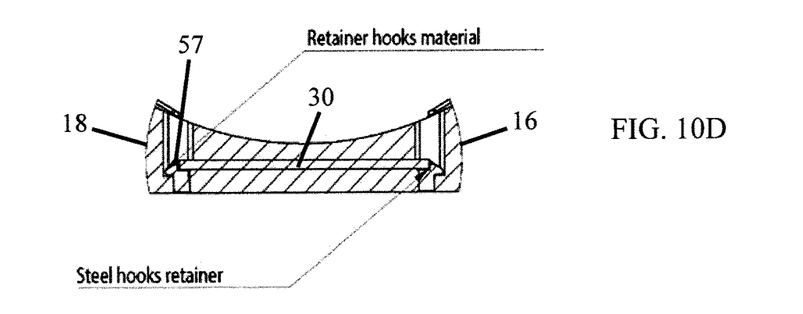
FIG. 10D is an enlarged view of section 10D of FIG. 10C.
Figure 11A:
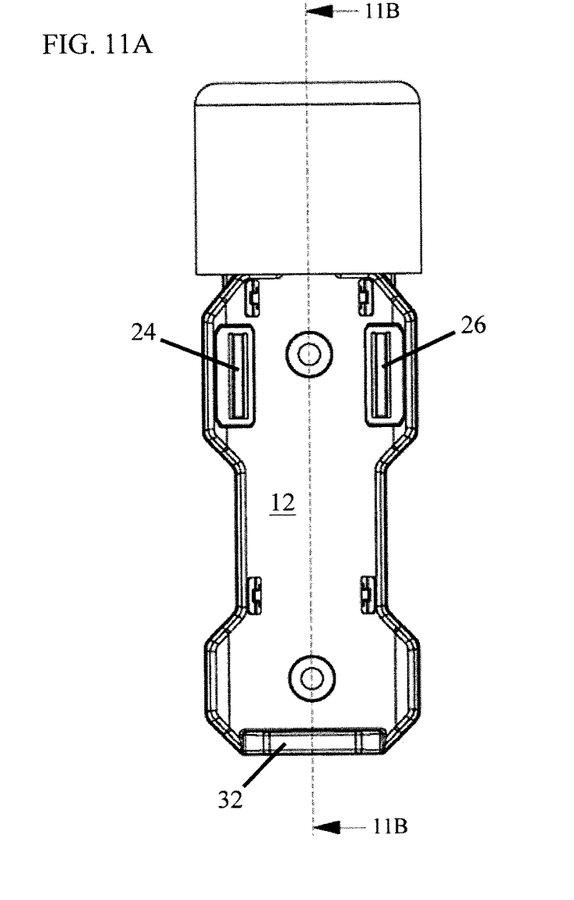
FIG. 11A is front view of the spray can holder of FIG. 1A holding a spray can cap.
Figure 11B:
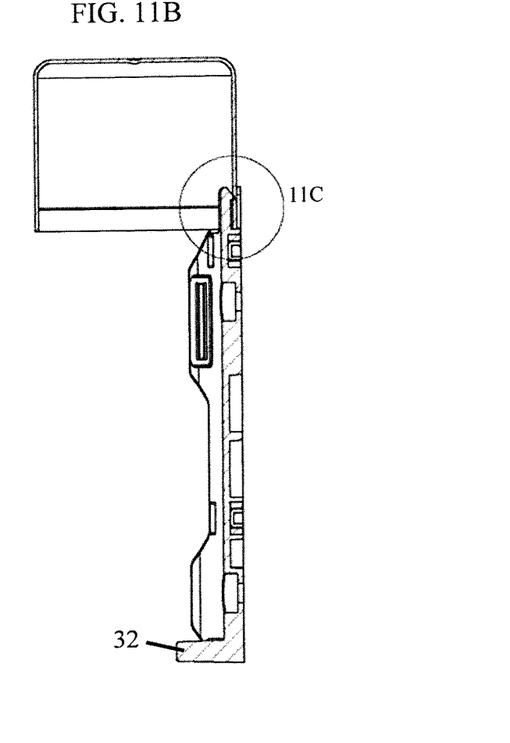
FIG. 11B is a cross-section of the spray can holder of FIG. 11A taken along lines 11B-11B.
Figure 11C:
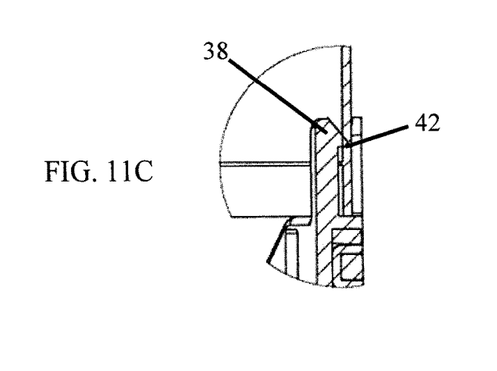
FIG. 11C is an enlarged view of section 11C of FIG. 11B.
Figure 11D:
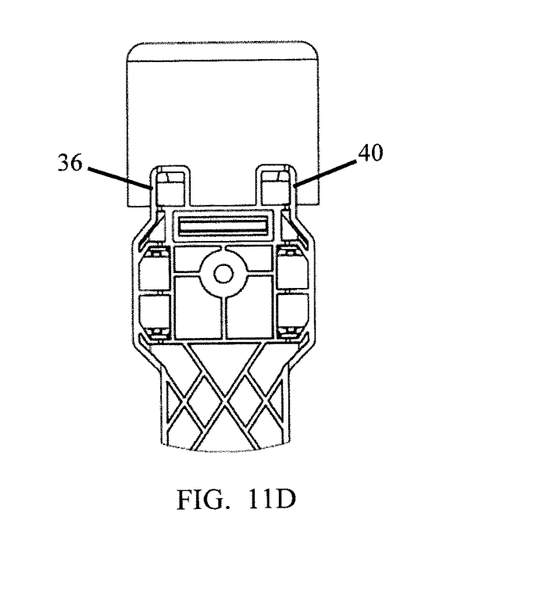
FIG. 11D is a partial back view of the spray can holder and cap of FIG. 11A.
Figure 12A:
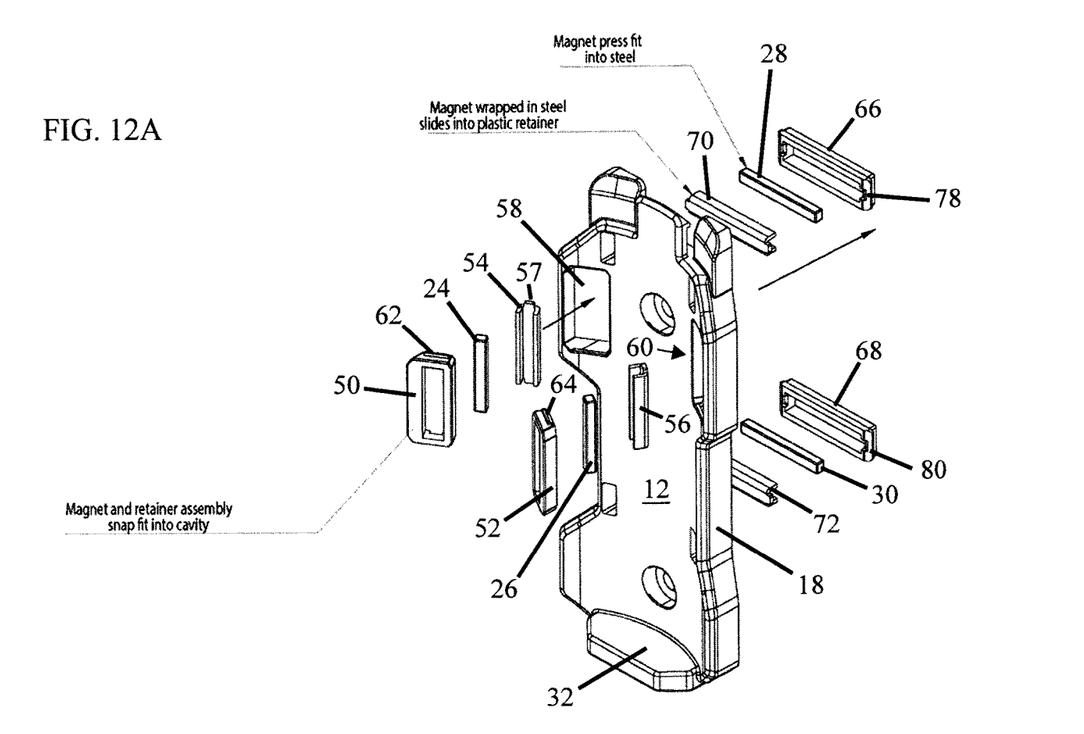
FIG. 12A is a front exploded view of the spray can holder of FIG. 1A.
Figure 12B:
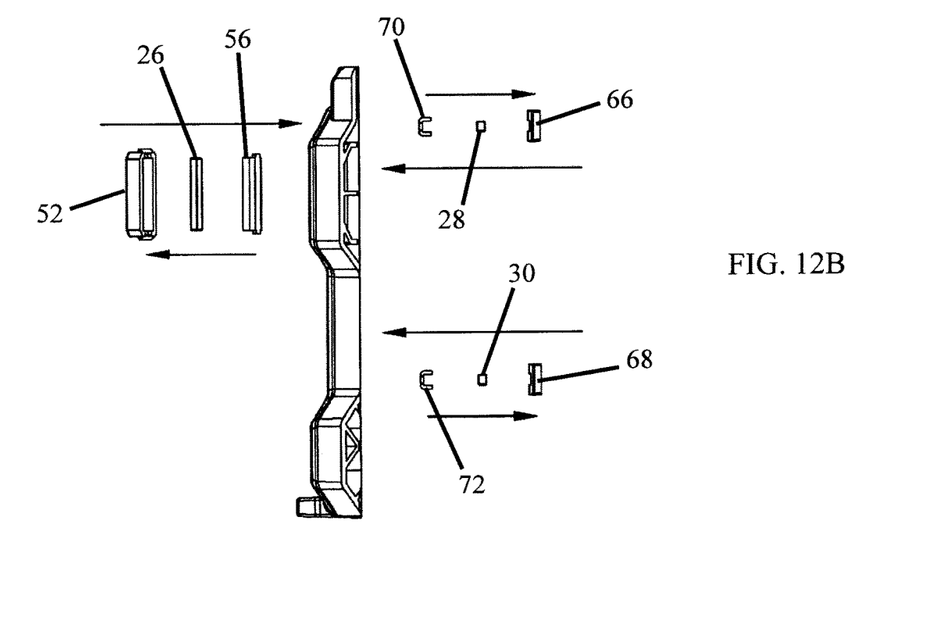
FIG. 12B is a side partial exploded view of the spray can holder of FIG. 1A.
Figures 13A, 13B:
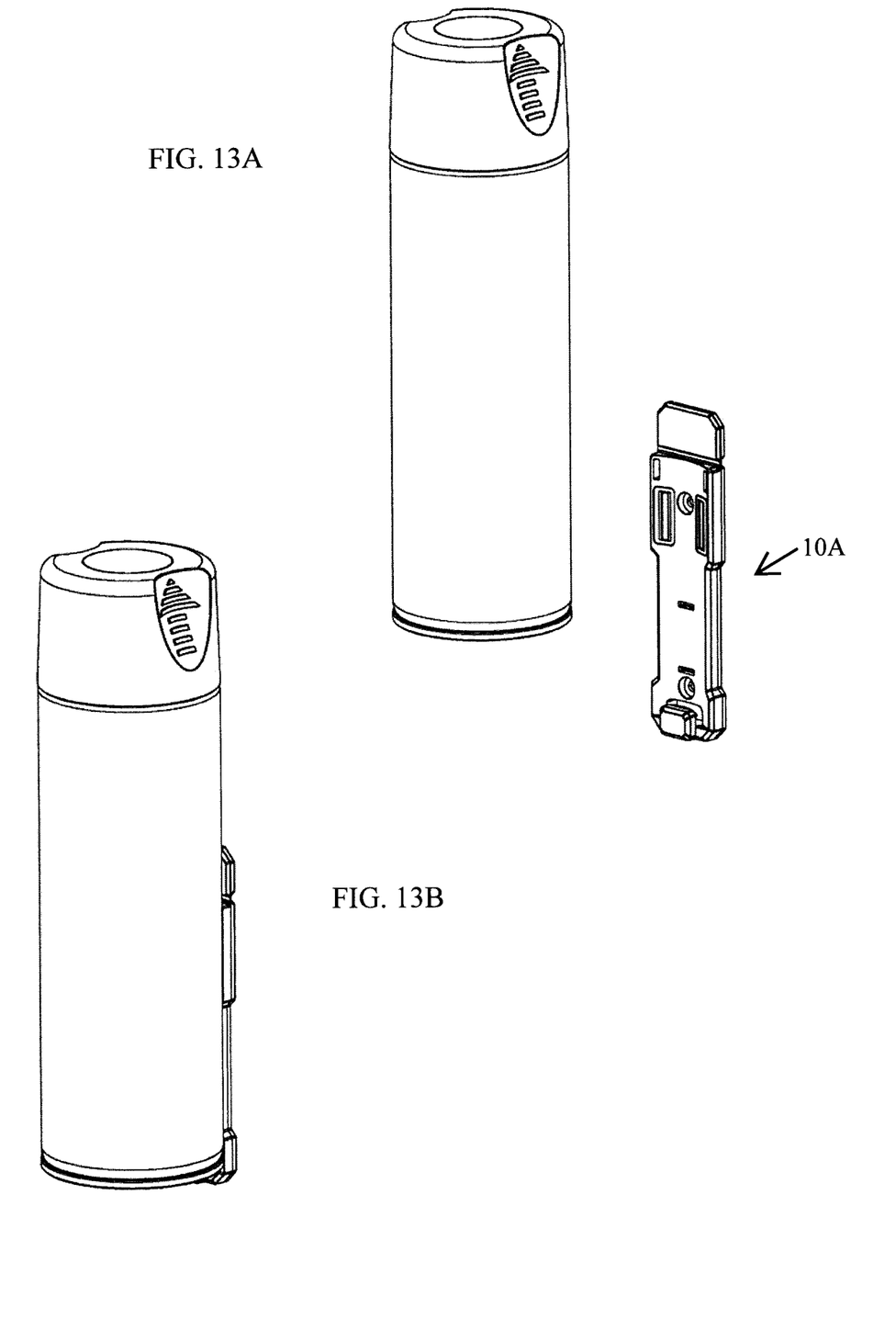
FIG. 13A is a front perspective view of a second embodiment of the spray can holder and a spray can.
FIG. 13B is the spray can holder of FIG. 13A with the spray can held in the holder.
Figures 14A, 14B:
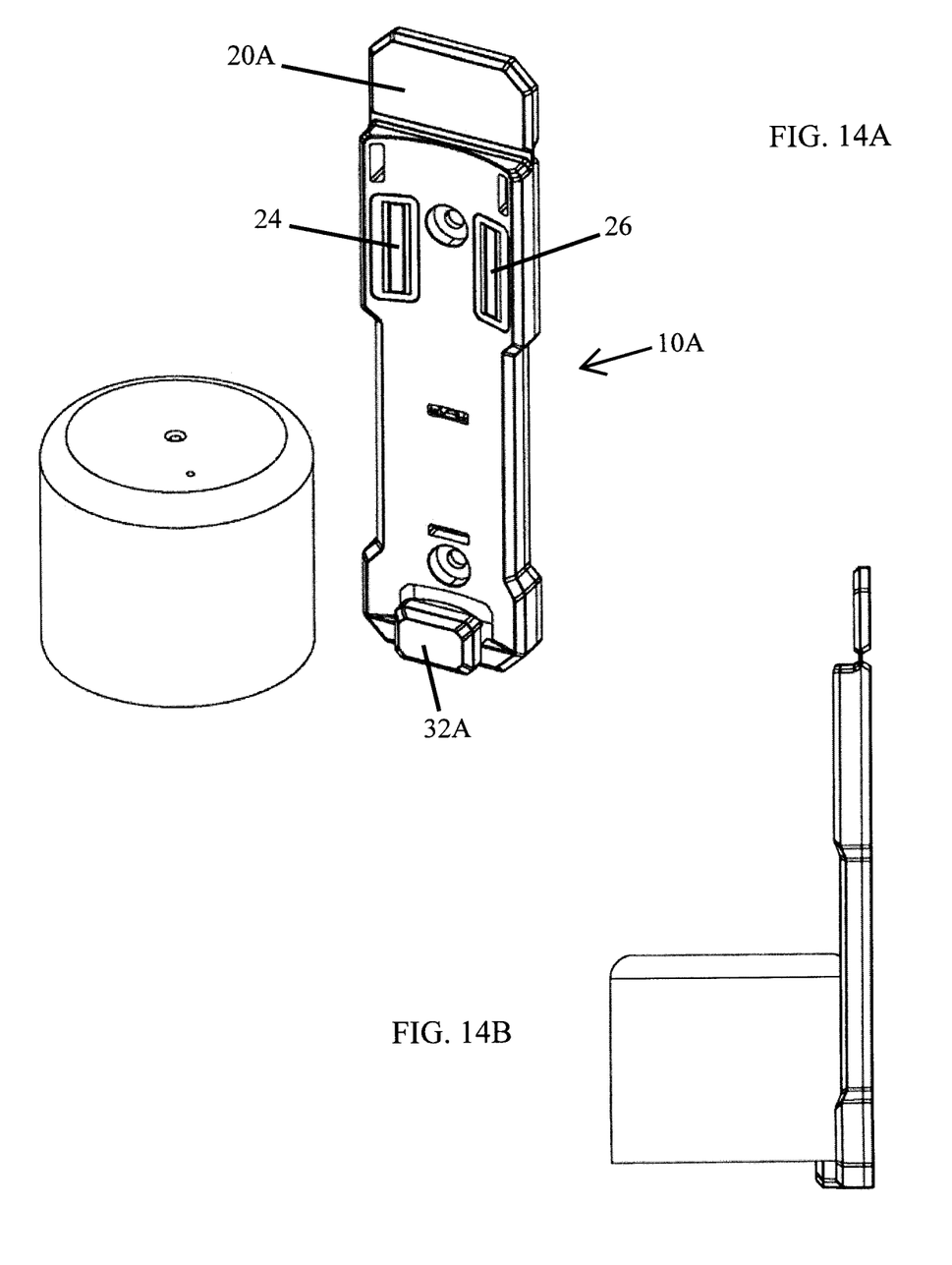
FIG. 14A is a front perspective view of the spray can holder of FIG. 13A and a spray can cap.
FIG. 14B is a side view of the spray can holder of FIG. 13A holding the spray can cap.
Figure 15:
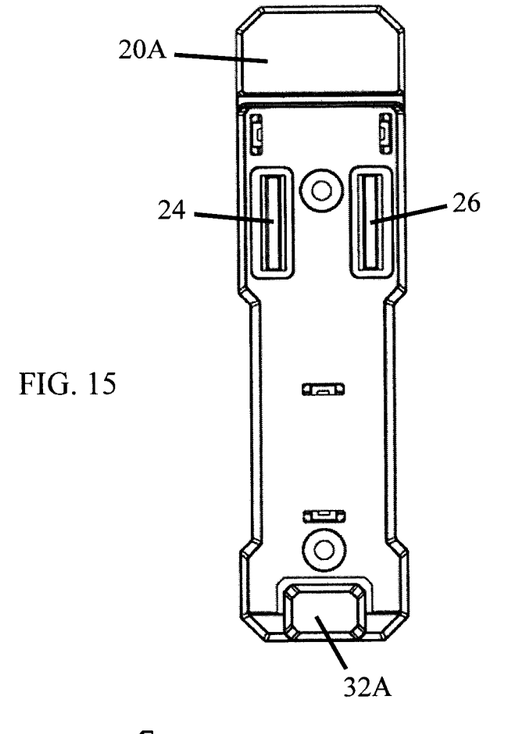
FIG. 15 is a front view of the spray can holder of FIG. 13A.
Figure 16:
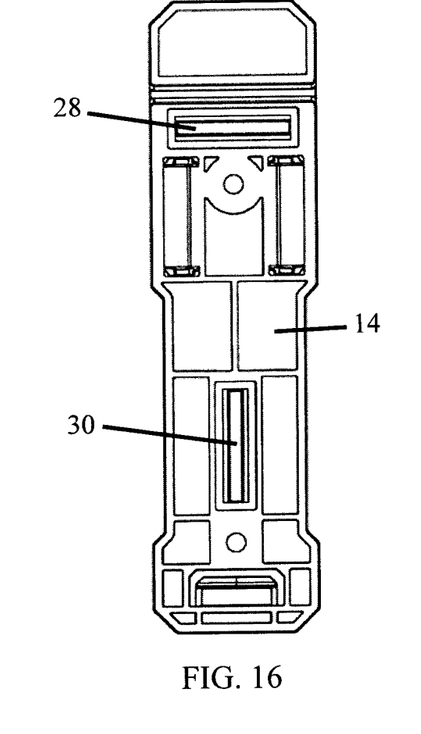
FIG. 16 is a back view of the spray can holder of FIG. 13A.
Figure 17:
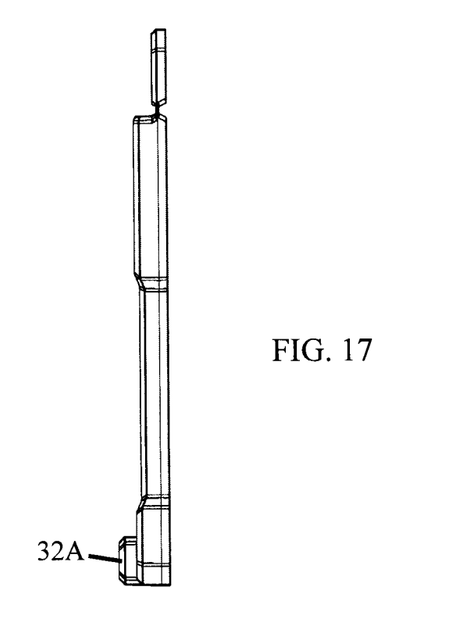
FIG. 17 is a side view of the spray can holder of FIG. 13A.
Figure 18:
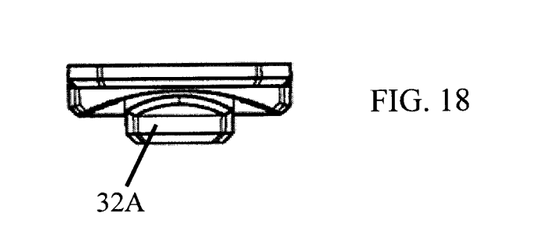
FIG. 18 is a top view of the spray can holder of FIG. 13A.
Figure 19:
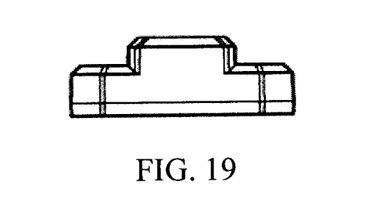
FIG. 19 is a bottom view of the spray can holder of FIG. 13A.
Figure 20A:
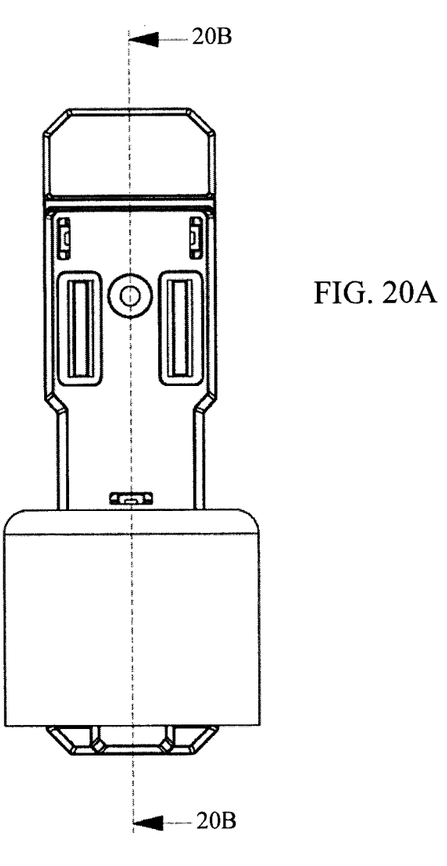
FIG. 20A is a front view of the spray can holder of FIG. 13A holding a spray can cap.
Figure 20B:
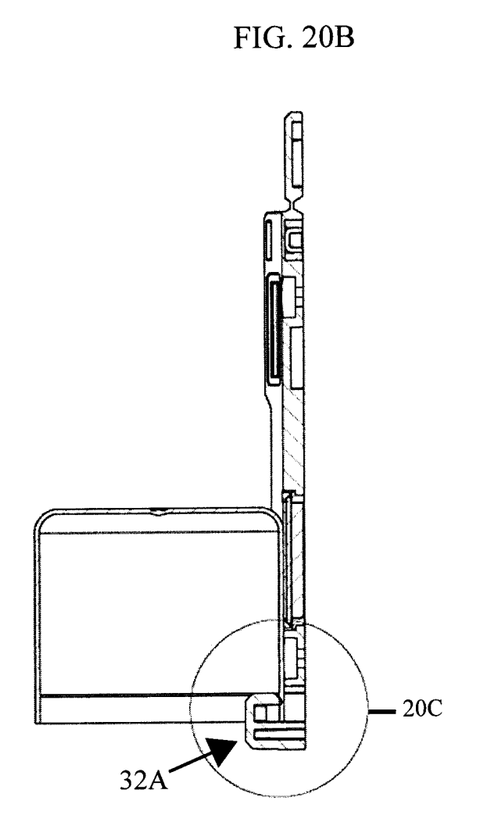
FIG. 20B is a cross-section of the spray can holder of FIG. 20A taken along lines 20B-20B.
Figure 20C:
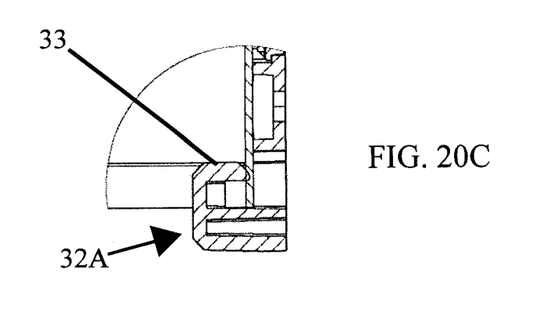
FIG. 20C is an enlarged view of section 20C of FIG. 20B.
Figure 21:
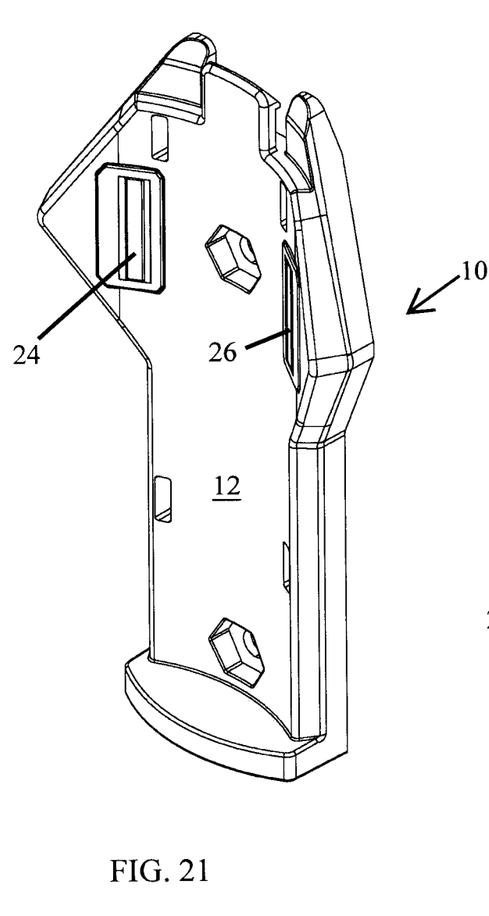
FIG. 21 is a front perspective view of a third embodiment of the spray can holder of the invention.
Figure 22:
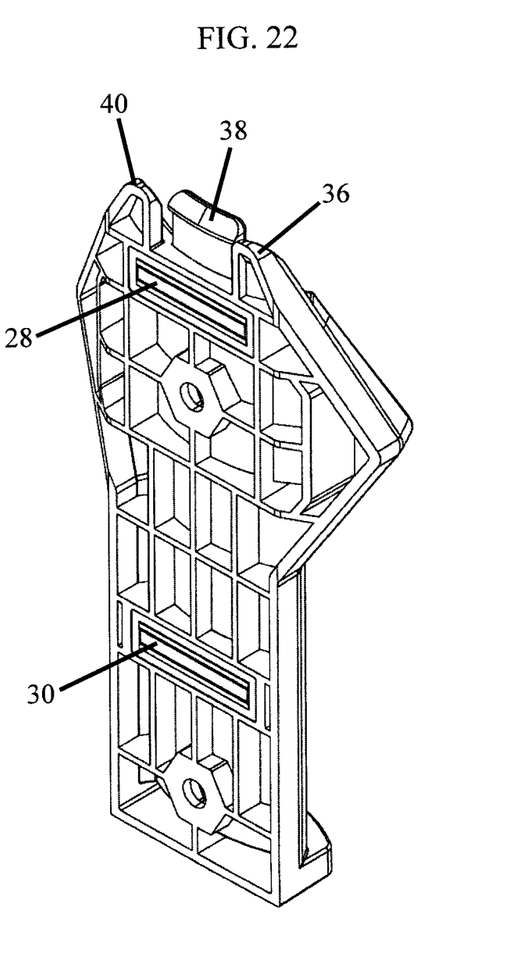
FIG. 22 is a back perspective view of the spray can holder of FIG. 21.
Figure 23:
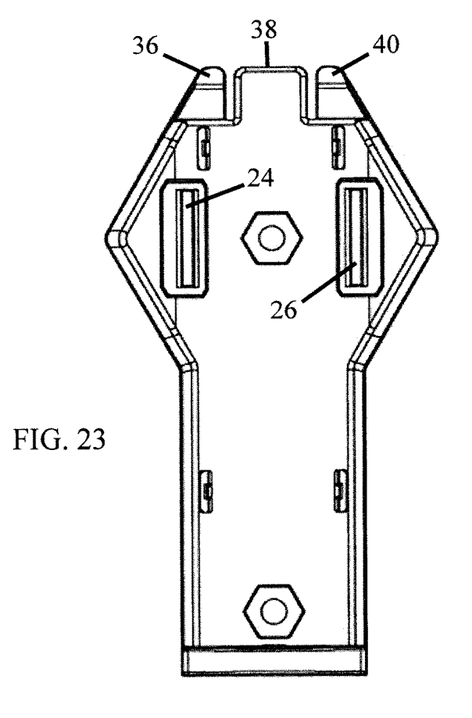
FIG. 23 is a front view of the spray can holder of FIG. 21.
Figure 24:
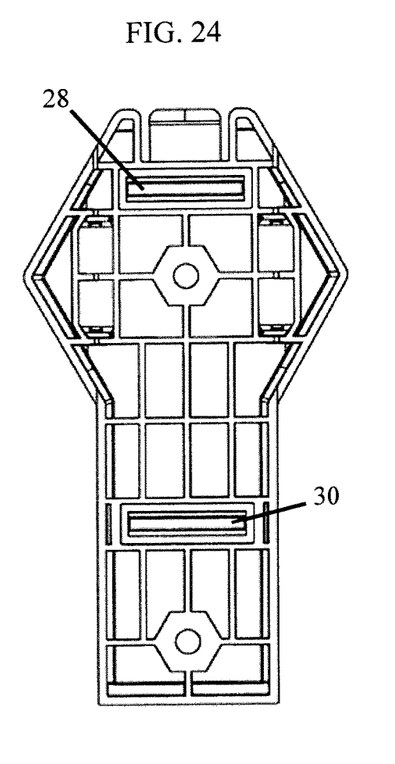
FIG. 24 is a back view of the spray can holder of FIG. 21.
Figure 25:
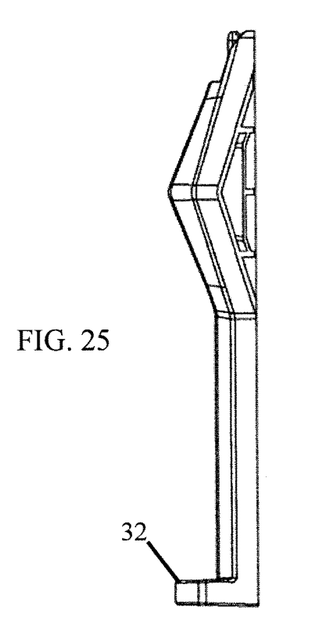
FIG. 25 is a side view of the spray can holder of FIG. 21.
Figure 26:
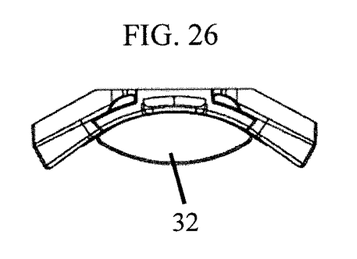
FIG. 26 is a top view of the spray can holder of FIG. 21.
Figure 27:
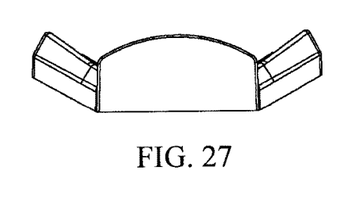
FIG. 27 is a bottom view of the spray can holder of FIG. 21.

Referring to FIGS. 12A and 12B, magnets 24 and 26 are placed in magnetic retainer assemblies 50,52. Magnets 24 and 26 are held in steel wrappers 54 and 56. Referring to FIGS. 10C and 10D, the steel wrappers include retaining hooks 57 at each end to fit into corresponding slots in the holder. The magnetic assemblies 50,52 are inserted into the front wall 12 at cavities 58 and 60 by snap fit and held in place by clips 62 and 64. Similarly, magnets 28 and 30 are held in back wall 14 by magnetic retainer assemblies 66,68. The magnets 28 and 30 are held in steel wrappers 70 and 72. The magnetic assemblies 66,68 are placed in cavities 74 and 76 in back wall 14 and held in place by snap fit and clips 78 and 80.

The spray can holder includes apertures 82 and 84 for holding the spray can holder on a peg board.

Referring to FIGS. 13-20, there is shown a second embodiment of the spray can holder 10A. This embodiment is substantially the same as the first embodiment in FIGS. 1-12 except for the placement of the magnets 28 and 30 in the back wall 14 in a vertical orientation as opposed to a horizontal orientation. Also, there is a clip 32A at bottom 22 for holding a spray can cap. Referring more specifically to FIGS. 20B and 20C, the clip 32A has an opening between the clip and the front wall wherein finger 33 holds the spray can cap by pressure. The top 20A is ornamental is design since it does not hold a spray can cap like spray can holder 10.

Referring to FIGS. 21-27, there is shown a third embodiment of the spray can holder. This embodiment is substantially the same as the spray can holder of FIGS. 1-12 except for the shape of the holder.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A flexible magnetic spray can holder comprising
   a front wall having one or more magnets adapted to hold a spray can,
   a back wall having one or more magnets adapted to attach the spray can holder to a metal surface, and
   wherein the spray can holder is made of plastic and adapted to be flexible.

2. The flexible magnetic spray can holder of claim 1 further comprising a top and a bottom wherein the top or the bottom includes a means to hold a spray can cap when the spray can is removed from the holder.

3. The flexible magnetic spray can holder of claim 2 wherein the means to hold the spray can cap is a clip.

4. The flexible magnetic spray can holder of claim 3 wherein the clip comprises three prongs.

5. The flexible magnetic spray can holder of claim 2 wherein the bottom includes a means for engaging the bottom of the spray can and to prevent the spray can from moving downward.

6. The flexible magnetic spray can holder of claim 5 wherein the means for engaging the bottom of the spray can is a ledge.

7. The flexible magnetic spray can holder of claim 1 wherein there are two magnets in the front wall and there are two magnets in the back wall.

8. The flexible magnetic spray can holder of claim 1 wherein one or more of the magnets are in a steel wrapper.

9. The flexible magnetic spray can holder of claim 1 wherein the magnets are in a magnet retainer assembly which includes a snap member to hold the magnet retainer assembly in the spray can holder.

10. The flexible magnetic spray can holder of claim 1 wherein the front wall has curvature to mate with the spray can.

11. The flexible magnetic spray can holder of claim 1 wherein the plastic is a thermoplastic elastomer.

12. A flexible magnetic spray can holder comprising
- a front wall having two magnets adapted to hold a spray can and the front wall has curvature to mate with the spray can,
- a back wall having two magnets adapted to attach the spray can holder to a metal surface,
- a top and a bottom wherein the top or the bottom includes a means to hold a spray can cap when the spray can is removed from the holder,
- wherein the bottom includes a means for engaging the bottom of the spray can and to prevent the spray can from moving downward, and
- wherein the spray can holder is made of plastic and adapted to be flexible.

13. The flexible magnetic spray can holder of claim 12 wherein one or more of the magnets are in a steel wrapper.

14. The flexible magnetic spray can holder of claim 13 wherein the magnets are in a magnet retainer assembly which includes a snap member to hold the magnet retainer assembly in the spray can holder.

15. The flexible magnetic spray can holder of claim 12 wherein the plastic is a thermoplastic elastomer.

\* \* \* \* \*